(12) United States Patent
Botrel et al.

(10) Patent No.: US 8,672,629 B2
(45) Date of Patent: Mar. 18, 2014

(54) COOLING OF THE TIP OF A BLADE

(75) Inventors: Erwan Botrel, Alfortville (FR); Régis Grohens, Tournan en Brie (FR)

(73) Assignee: SNECMA, Paris (FR)

( * ) Notice: Subject to any disclaimer, the term of this patent is extended or adjusted under 35 U.S.C. 154(b) by 601 days.

(21) Appl. No.: 12/921,295

(22) PCT Filed: Mar. 4, 2009

(86) PCT No.: PCT/FR2009/050347
§ 371 (c)(1),
(2), (4) Date: Feb. 11, 2011

(87) PCT Pub. No.: WO2009/115728
PCT Pub. Date: Sep. 24, 2009

(65) Prior Publication Data
US 2011/0135496 A1 Jun. 9, 2011

(30) Foreign Application Priority Data
Mar. 5, 2008 (FR) .................................... 08 51424

(51) Int. Cl.
*F01D 5/18* (2006.01)
(52) U.S. Cl.
USPC ......................................... 416/92; 416/97 R
(58) Field of Classification Search
USPC ..................... 416/92, 96 R, 97 R; 415/115
See application file for complete search history.

(56) References Cited

U.S. PATENT DOCUMENTS

| 4,244,676 | A | | 1/1981 | Grondahl et al. |
| 4,390,320 | A | * | 6/1983 | Eiswerth ..................... 416/97 R |
| 5,117,626 | A | | 6/1992 | North et al. |
| 5,503,527 | A | * | 4/1996 | Lee et al. ......................... 416/91 |
| 5,733,102 | A | * | 3/1998 | Lee et al. .................... 416/97 R |
| 6,059,530 | A | | 5/2000 | Lee |
| 6,086,328 | A | * | 7/2000 | Lee ............................. 416/97 R |
| 6,190,129 | B1 | * | 2/2001 | Mayer et al. ................ 416/97 R |
| 8,133,032 | B2 | * | 3/2012 | Tibbott et al. ................. 416/235 |
| 8,425,183 | B2 | * | 4/2013 | Lee et al. ................... 415/173.1 |

(Continued)

FOREIGN PATENT DOCUMENTS

| DE | 199 04 229 | 8/2000 |
| EP | 0 718 467 | 6/1996 |

(Continued)

OTHER PUBLICATIONS

Office Action issued Mar. 12, 2013 in Japanese Patent Application No. 2010-549180 with English language translation.

(Continued)

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

A turbine blade including an open cavity at its distal tip, the cavity being defined by a bottom wall and a side wall extending along the perimeter of the distal tip in an extension of the upper and lower walls of the blade, the side wall of the cavity including an opening in a vicinity of the leading edge of the blade opening into the cavity. A deflector extends at least in the middle portion of the cavity between the leading edge and the trailing edge.

13 Claims, 2 Drawing Sheets

(56) References Cited

U.S. PATENT DOCUMENTS

| | | | |
|---|---|---|---|
| 2002/0090301 A1* | 7/2002 | Lee et al. | 416/224 |
| 2004/0096328 A1* | 5/2004 | Soechting et al. | 416/92 |
| 2006/0062671 A1* | 3/2006 | Lee et al. | 416/92 |
| 2006/0182633 A1 | 8/2006 | Harvey | |
| 2009/0162200 A1* | 6/2009 | Tibbott et al. | 416/91 |

FOREIGN PATENT DOCUMENTS

| | | |
|---|---|---|
| EP | 1 221 537 | 7/2002 |
| EP | 1 693 552 | 8/2006 |
| FR | 2 457 967 | 12/1980 |
| JP | 50-10102 A | 2/1975 |
| JP | 56-9605 A | 1/1981 |
| JP | 63-26242 A | 2/1988 |
| JP | 4-234535 A | 8/1992 |
| JP | 2002-235503 A | 8/2002 |

OTHER PUBLICATIONS

Office Action issued May 23, 2013 in Russian Patent Application No. 2010140596/06 with English language translation.

Combined Office Action and Search Report issued Jul. 29, 2013 in Chinese Patent Application No. 200980107513.X with English language translation.

E. A. Manuchine, "Gas turbine problems and perspectives", Moscow, Energetics and Atomics Edition, 1986, pp. 133-134 with cover page and partial English translation.

* cited by examiner

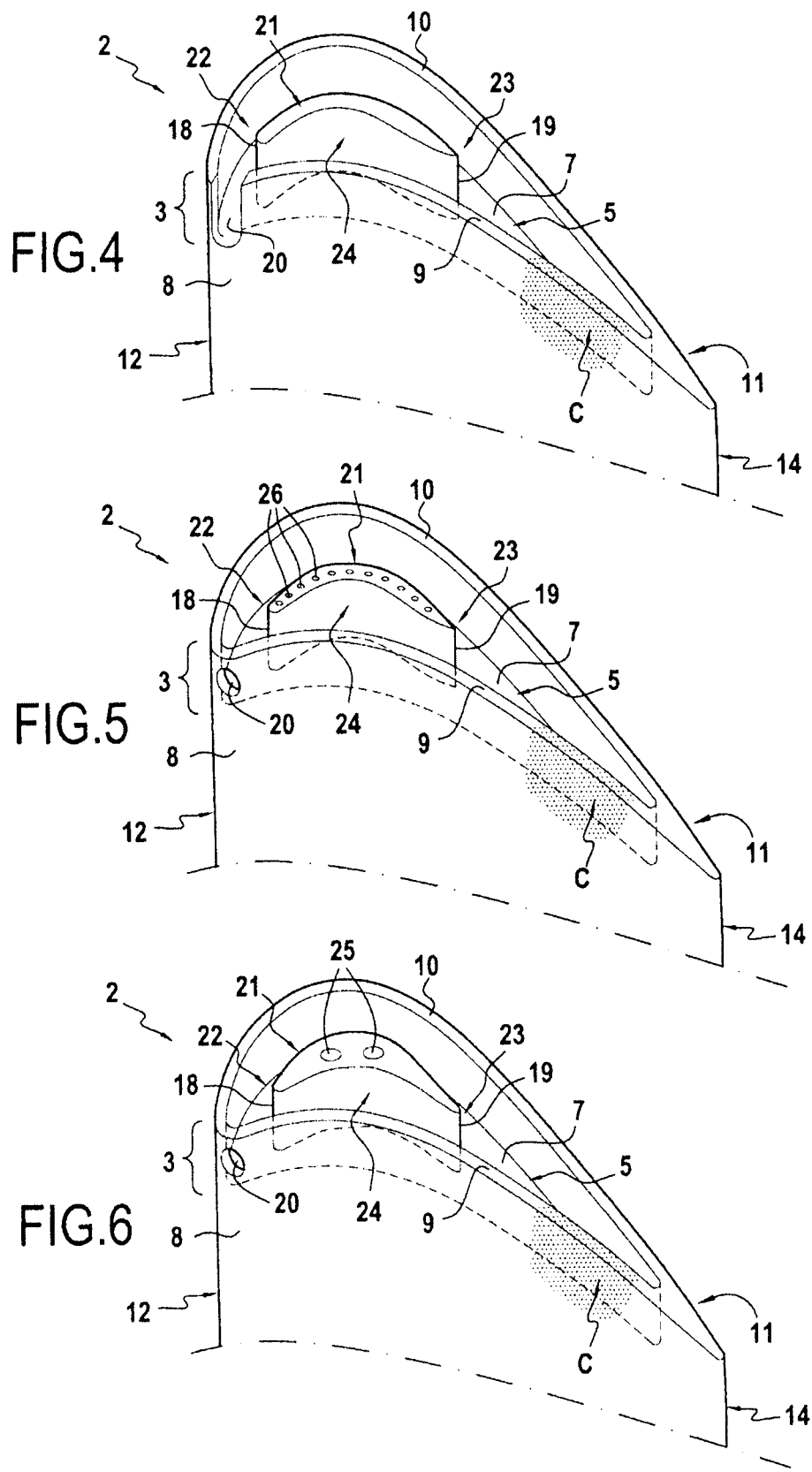

COOLING OF THE TIP OF A BLADE

BACKGROUND OF THE INVENTION

1. Field of the Invention

The invention concerns a turbine blade and, more particularly, can concern a hollow blade of a gas turbine rotor, of the high-pressure type, of a turbojet engine.

2. Description of the Related Art

As illustrated in FIGS. 1 and 2, it is known to provide, at the distal tip 3 of a hollow blade 2, an open cavity 5, or "bathtub", defined by a bottom wall 7 that extends over the entire tip of the blade and by a side wall made up of two rims 9 and 10. These rims extend between the leading edge 12 and the trailing edge 14 of the blade. The rim 9 extends the wall 8 on the lower surface of the blade and the other rim 10 extends the wall 11 on the upper surface of the blade. These rims are hereinafter called upper surface and lower surface rims.

The rims 9 and 10 make it possible to ensure a wear zone between the bottom wall 7 and the casing 16 that makes it possible to absorb the contact between the distal tip of the blade 3 and the casing 16. Moreover, they make it possible to limit the passage of gas from the upper surface toward the lower surface generating aerodynamic losses that are detrimental to the yield. Due to the high temperatures of the gases passing the turbine and the high rotational speeds of the blade, the walls of the blade and of the cavity 5 can locally reach critical temperatures.

Document EP 1 221 537 proposes cooling these walls by forming an opening on the side wall of the cavity in the vicinity of the leading edge of the blade, preferably on the lower surface side. Moreover, this opening may potentially have a small inner rim that channels the gases entering the cavity through said opening. However, the solution proposed by this document does not allow sufficient cooling of several zones of the cavity.

Indeed, the gradient of the temperatures T of the gases in the vicinity of the blade depending on the height H of the vein of the gases (FIG. 3) is particularly damaging for several zones of the cavity. Thus, this gradient of the temperatures combined with the topology of the gas flows along the blade makes the hottest gases impact the critical zone C of the blade. This zone C is situated at the tip 3 of the blade in the vicinity of the trailing edge 14, on the lower surface side 8.

BRIEF SUMMARY OF THE INVENTION

The aim of the present invention is to improve the cooling of said zone and of the entire open cavity of the distal tip of a turbine blade. More particularly, the present invention proposes to improve the local cooling of the zone situated at the apex of the blade, in the vicinity of the trailing edge, on the lower surface side.

To achieve this aim, the object of the invention is a turbine blade having a cavity open at its distal tip, said cavity being defined by a bottom wall and a side wall extending along the perimeter of said distal tip in the extension of the lower surface and upper surface walls of the blade, the side wall of the cavity having an opening in the vicinity of the leading edge of the blade opening into the cavity, and a deflector extending at least in the median portion of the cavity between the leading edge and the trailing edge.

The advantage of such a blade is that the deflector makes it possible to direct the relatively cooler gas flows (see FIG. 3), having entered the cavity through the opening of the side wall, directly toward a preferential zone of the walls of the cavity. This gas current impacts this preferential zone and allows cooling by increased convection of the latter. The aim is to direct an optimized quantity of gas on a particularly stressed zone from a thermal perspective. Thus, in addition to correctly cooling the latter zone, it is possible to obtain homogenous cooling of all of the walls of the cavity.

The invention also concerns a turbine comprising at least one blade according to the invention and a turbomachine, such as an airplane turbojet engine, comprising at least one such turbine.

BRIEF DESCRIPTION OF THE SEVERAL VIEWS OF THE DRAWINGS

The invention and its advantages will be better understood upon reading the following detailed description of different embodiments shown as non-limiting examples. This description refers to the appended figures, in which:

FIG. 4 is a perspective view of a first embodiment of a blade according to the invention, FIG. 5 is a perspective view of a second embodiment of a blade according to the invention, FIG. 6 is a perspective view of a third embodiment of a blade according to the invention.

DETAILED DESCRIPTION OF THE INVENTION

Figure 1:
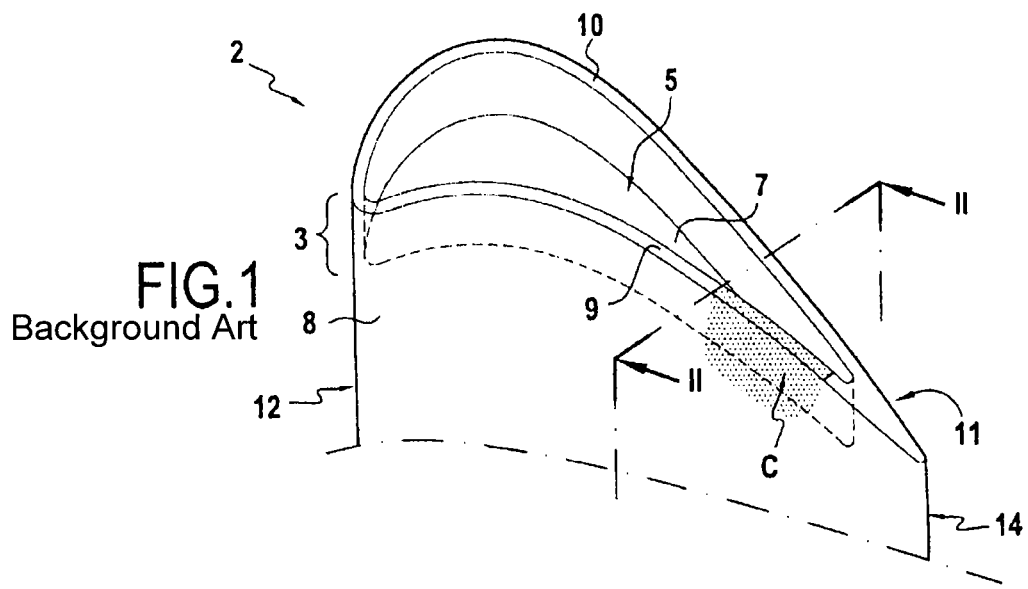
FIG. 1 is a perspective view of the distal tip of a known blade.
Figure 2:
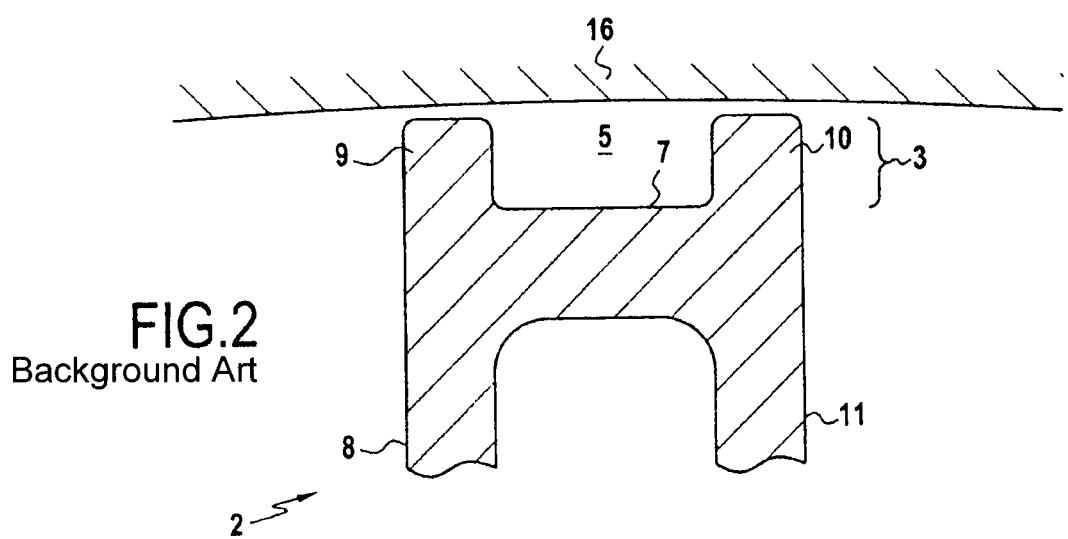
FIG. 2 is a view of the blade of FIG. 1 along cutting plane II.
Figure 3:
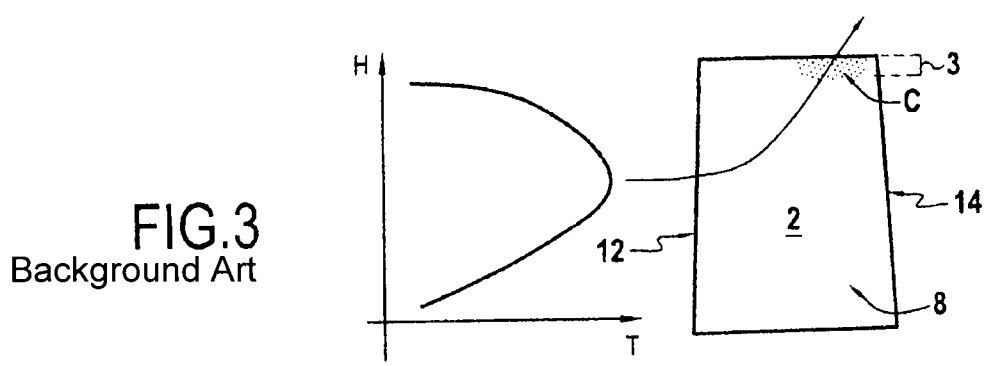
FIG. 3 is a graphic representation of the evolution of the temperature gradient T of the gases over the height H of the vein of the gases in the vicinity of a blade.

A first embodiment of the invention is described in reference to FIG. 4. In this embodiment, the opening 20 of the side wall 9, 10 of the cavity 5 is situated in the vicinity of the leading edge 12 of the blade 2, on the lower surface side 8. Without being restrictive, this opening position 20 makes it possible to withdraw the cooling gases (i.e. essentially less hot) in the outer portion of the vein of the gases particularly effectively. Of course, depending on the geometry of the blade and the angle of incidence of the gases, the opening 20 may be placed further downstream on the lower rim 9 or on the other side on the upper rim 10.

In this example, the opening 20 of the side wall 9, 10 of the cavity 5 is a recess. The height of this recess can vary according to different embodiments. Here, the recess extends over the entire height of the side wall 9, 10 of the cavity 5. This recess height has the advantage, for a given width, of providing the cavity with a maximum gas flow.

In this first embodiment, the deflector 21 has several interesting features. The deflector 21 is essentially perpendicular to the bottom wall 7 of the cavity 5. This positioning of the deflector 21 relative to the bottom wall 7 of the cavity 5 improves the orientation of the gas toward the zone C to be cooled.

The active face 24 of the deflector 21 is concave, the concavity of the deflector 21 having essentially the same orientation as the concavity of the blade 2. In this way, the deflector 21 has a dual advantage. First, for a given length, a concave deflector fits optimally into the cavity 5. Then, this allows the deflector 21 to impose a stream line on the gas flow that best fits the shape of the lower rim 9 of the cavity 5. Thus, while orienting the cooling gas flow toward the zone C, other zones of the cavity 5 are also cooled by this cooling gas current, which circulates along the lower rim 9. Of course the concavity of the deflector 21 is not limited to the illustrated example and can advantageously be adjusted to each type of blade.

The upstream tip 18 of the deflector 21 is distant from the leading edge 12 of the blade 2. Likewise, the lower tip 19 of the deflector 21 is distant from the trailing edge 14 of the blade 2. These distances relative to the leading and trailing edges make it possible to adjust the direction of the flows and the quantity of cooling gas guided. The relative distances of the deflector relative to the upper 9 and lower 10 rims are also important parameters that make it possible to optimize such a system.

Still in reference to FIG. 4, the upstream portion 22 of the deflector 21 is oriented toward the leading edge 12 of the blade 2. Likewise, the downstream portion 23 of the deflector 21 is oriented toward the trailing edge 14 of the blade 2. These orientations of the upstream 22 and downstream 23 portions of the deflector 21 are advantageous for guiding the cooling gas flow toward the zone C. Moreover, these orientations make it possible to impose stream lines on the gas flow that are particularly effective for the homogeneity of the cooling of all of the walls of the cavity 5.

A second embodiment of the invention is described in reference to FIG. 5. In this example, the opening 20 of the side wall 9, 10 of the cavity 5 is a hole. The cylindrical shape of the hole illustrated in this example is not limiting. The hole can have an oblong or triangular shape, among others. As side wall opening of the cavity 5, the hole has the advantage of being able to precisely adjust the flow of cooling gas entering the cavity 5.

This second example illustrates a hollow blade 2 supplied with cooling gas, and the deflector 21 includes cooling holes 26 communicating with at least one hollow portion of the blade. These cooling holes are radial bores in the deflector 21. They open into an inner cavity of the blade 2 situated under the deflector 21. The cooling of the deflector 21 is thus ensured by pumping and heat conduction. Moreover, the cooling of the deflector 21 makes it possible to lower, by convection, the temperature of the gases deviated by the latter, consequently increasing the heat efficiency of the system.

A third embodiment of the invention is described in reference to FIG. 6. This third example shows a hollow blade 2 supplied with cooling gas, and the deflector 21 includes dust extraction holes 25 communicating with at least one hollow portion of the blade. These dust extraction holes are similar to the cooling holes and ensure, like the latter, the cooling of the cavity 5. However, they have a larger diameter than that of the traditional cooling holes. The larger diameter of the dust extraction holes allows the evacuation of dust that may be present in the inner cavity(ies) of the blade. Thus, on a deflector having both types of holes, the dust will preferably pass through the dust extraction holes rather than through the narrower cooling holes. One therefore avoids covering the cooling holes of small diameter.

Because of the significant diameter of these dust extraction holes, it is necessary for the deflector 21 to have a greater thickness than in the preceding examples.

The invention claimed is:

1. A turbine blade comprising:
    an open cavity at a distal tip of the blade, the cavity being defined by a bottom wall and a side wall extending along a perimeter of the distal tip in a continuous extension of a lower surface wall and an upper surface wall of the blade;
    an opening provided in the side wall of the cavity in a vicinity of a leading edge of the blade opening into the cavity; and
    a deflector which extends at least in a median portion of the cavity between the leading edge and a trailing edge,
    wherein the deflector includes a first concave face and a second convex face, the first concave face facing a lower surface wall side of the side wall and the second convex face facing an upper surface wall side of the side wall, and
    wherein an upstream tip of the deflector is distant from the leading edge of the blade and a downstream tip of the deflector is distant from the trailing edge of the blade such that the deflector is separate from the side wall.

2. The blade according to claim 1, wherein the opening of the side wall of the cavity is situated in the vicinity of the leading edge of the blade, on the lower surface side.

3. The blade according to claim 1, wherein the deflector is essentially perpendicular to the bottom wall of the cavity.

4. The blade according to claim 1, wherein the first concave face of the deflector is an active face of the deflector, and concavity of the deflector is essentially a same orientation as concavity of the blade.

5. The blade according to claim 1, wherein an upstream portion of the deflector is oriented toward the leading edge of the blade.

6. The blade according to claim 1, wherein a downstream portion of the deflector is oriented toward the trailing edge of the blade.

7. The blade according to claim 1, wherein the opening of the side wall of the cavity is a hole.

8. The blade according to claim 1, wherein the opening of the side wall of the cavity is a recess.

9. The blade according to claim 1, wherein the blade is hollow and supplied with cooling gas, and wherein the deflector includes cooling holes connected with at least one hollow portion of the blade.

10. The blade according to claim 1, wherein the blade is hollow and supplied with cooling gas, and wherein the deflector includes dust extraction holes communicating with at least one hollow portion of the blade.

11. A turbine including at least one blade according to claim 1.

12. A turbomachine or an airplane turbojet engine, comprising at least one turbine according to claim 11.

13. The blade according to claim 9, wherein the deflector includes dust extraction holes communicating with the at least one hollow portion of the blade, the dust extraction holes having a larger diameter than the cooling holes.

* * * * *